TAPE EDITOR

Filed Dec. 7, 1961 2 Sheets-Sheet 1

INVENTORS.
D. W. BERNARD
J. M. COLAGROSSI
BY Louis Altman
ATTORNEY

TAPE EDITOR

Filed Dec. 7, 1961 2 Sheets-Sheet 2

INVENTORS
D. W. BERNARD
J. M. COLAGROSSI
BY Louis Altman
ATTORNEY

United States Patent Office
3,245,046
Patented Apr. 5, 1966

3,245,046
TAPE EDITOR

David William Bernard, Norwalk, and Joseph Michael Colagrossi, Stratford, Conn., assignors to Sperry Rand Corporation, New York, N.Y., a corporation of Delaware Filed Dec. 7, 1961, Ser. No. 157,767
10 Claims. (Cl. 340—172.5)

The present invention relates generally to data-processing, and in particular to equipment for preparing data storage tapes.

In data processing, the data is often stored on magnetic or punch tape. Using the latter as an example, a tape punch records data on a strip of paper tape by translating the data into coded symbols and representing those symbols by an arrangement of holes punched in the tape. A hole or the absence thereof may appear at the several hole positions of each such symbol. In the conventional five-level punch code, there are five such hole positions per symbol. Tape reading units are provided which scan the punched tape, sense the presence or absence of the holes, and produce output signals corresponding to the symbols recorded thereon. These signals can then be used for program control of any suitable piece of output equipment. Another tape punch unit, for example, can be employed for the purpose of reproducing the original tape.

In the editing system of this invention, after each line of data is recorded, a determination is made as to whether the line is correct or contains an error. Then coded information indicating whether or not the line is acceptable is recorded adjacent to the line, thus providing a key to selective reproduction as a means of editing the tape.

It is broadly an object of this invention to provide a novel device for editing tapes and other types of data records.

More specifically, it is an object of the invention to provide a device which reproduces only those lines of a data record which are indicated to be acceptable, omitting the remaining lines.

An aditional object is to provide a device of the type described which responds to the conventional five-level punch code, and which is also adaptable for use with any other multi-level code, and with magnetic tape or any other type of data record.

In accordance with an illustrative embodiment demonstrating these and other objects of the present invention, there is provided a device for producing an amended reproduction of a data record which contains acceptance-rejection instructions. This device comprises recording means operable to reproduce the data record in response to an input representing the data thereon, and means operable to disable the recording means in response to a rejection instruction input. Thus, no portion of the data is reproduced if it is signalled as unacceptable by the information on the data record.

The foregoing brief summary, as well as additional features of the invention, may best be appreciated by reference to the following detailed description, when read in conjunction with the accompanying drawings, wherein.

Figure 1:
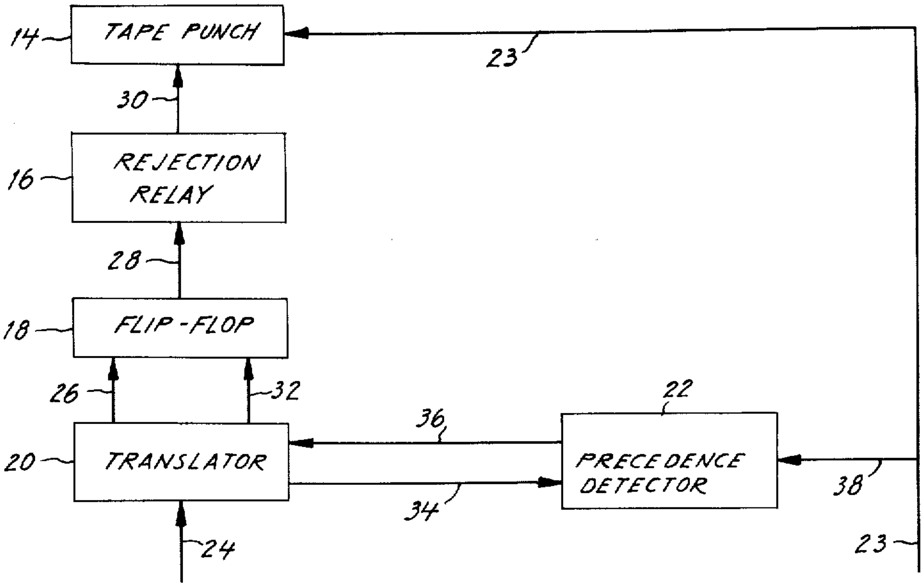
FIG. 1 is a block diagram illustrating the functional organization of a tape editor in accordance with this invention.

In an illustrative tape punch system which can be employed with the device of this invention, during the punching of an original tape the correctness of each line of data is determined after the line has been recorded on the tape, and acceptability information pertaining to that line is then recorded at the end of the line. For example, if a particular line of data is found to be acceptable, a coded acceptance instruction is recorded at the end thereof and the operator goes on to record the next line. If the line is found to contain an error, however, a coded rejection instruction is recorded at the end thereof and the operator next attempts to record a correct version of the line, followed by a coded acceptance instruction.

Then, in order to produce an amended copy of the tape, the original is fed through a tape reader in the reverse direction so that the acceptability information at the end of each line is read before the remainder of the line. A tape editing device in accordance with this invention operates in response to the output of the tape reader to reproduce on a copy tape only those data lines which are preceded by a coded acceptance instruction. Erroneous lines are omitted because a coded rejection instruction from the reader prevents the device from reproducing the ensuing line of data, reproduction being resumed only when the following correct version of the line is read, preceded by a coded acceptance instruction from the reader. In this manner the tape editor produces an amended copy which contains only a succession of correct lines without any intervening spaces or erroneous material. Although the amended copy must be recorded in the reverse direction, because that is the direction in which the original is read during reproduction, this fact does not prevent the amended copy from subsequently being read in the normal forward direction for ultimate use.

Both the data and the acceptability information may be recorded in the conventional five level punch code in which each symbol consists of a coded combination of five bits or hole positions. The hole positions of any one symbol extend across the breadth of the tape in a bit-parallel arrangement for simultaneous writing or reading thereof, while successive symbols follow each other serially along the length (i.e. the direction of feed) of the tape for consecutive writing or reading thereof. In order for the five-level system to provide enough code combinations to represent all the letters of the alphabet as well as all the decimal digits, punctuation marks, and any other characters or program instructions required, many of the code combinations are assigned two meanings. One of two "precedence" instruction symbols accompanies each of these ambiguous character or program instruction symbols to indicate which meaning prevails. These precedence symbols which also consist of coded combinations of five bits, unambiguously condition the output equipment to interpret the accompanying character or program instruction code as having a particular one of its two assigned meanings. A letters precedence code symbol, for example, may require the accompanying character code symbol to be interpreted as an alphabetical character, while the occurrence of a figures precedence code symbol may require the same code symbol to be interpreted as a numerical character. Various punctuation marks and other characters and program instructions are also letters or figures precedence coded, according to a predetermined code for which the equipment is designed.

The acceptability information, including both acceptance and rejection instructions, is figures precedence coded. Therefore the tape editor is designed to respond to the acceptance and rejection code symbols as though they have an acceptability meaning when and only when they are preceded by a figures precedence code.

When the accompanying precedence code is for letters precedence, then the acceptance and rejection code symbols have some other meaning, and the tape corrector must respond accordingly. Thus the acceptability information recorded at the end of each data line includes an acceptance or rejection code symbol followed immediately by a figures precedence code symbol. Then when the tape is read backwards during reproduction, each acceptability code symbol is preceded in reading order by a figures precedence code symbol to condition the tape editor for the proper response thereto.

Referring specifically to the drawings, FIG. 1 shows in general terms the functional organization of a tape editor in accordance with this invention. The original tape containing erroneous data lines is fed backwards through a tape reader (not shown) which thus scans the original tape and produces a sequence of outputs corresponding to the reverse sequence of code symbols recorded thereon. This output is supplied, in a manner to be described, to the tape editor, which comprises a tape punch unit 14 for reproducing desired portions of the original tape on a copy tape fed therethrough, a rejection relay 16 for disabling the tape punch 14 so as to omit the undesired portions, and an acceptance-rejection flip-flop 18, translator 20, and precedence detector 22, all of which cooperate to effect energization of the rejection relay 16 only on the occurrence of both a figures precedence and a rejection code, otherwise leaving the relay deenergized to permit operation of the tape punch 14.

The tape reader produces two outputs, both of which correspond to the coded information recorded on the original tape. One of these, represented schematically by the arrow 23, goes to the tape punch 14 to provide program control under which the latter reproduces the contents of the original tape so far as it is allowed to do so by the rejection relay 16. The other output, represented by arrow 24, goes to the translator 20, which is designed to respond to any one of three codes: rejection, acceptance, and letters precedence. On receiving a rejection code, the translator 20 produces an output, represented by arrow 26, which switches the acceptance-rejection flip-flop 18 to the proper conduction state to produce an output, represented by arrow 28, that energizes rejection relay 16. Upon such energization, the rejection relay 16 opens the power supply circuit of tape punch 14. This operation, represented by arrow 30, results in disabling the tape punch 14 in order to omit an erroneous data line from the copy tape.

If the translator 20 receives an acceptance code from the reader 10, however, it produces another output, represented by arrow 32, which switches the acceptance-rejection flip-flop 18 out of the conduction state for energizing the rejection relay 16, thereby disabling the rejection relay and preventing it from interfering any longer with the recording operation by tape punch 14. This results in the inclusion of an acceptable data line in the copy tape.

Such energization and deenergization of rejection relay 16 in response to an apparent rejection or acceptance code must not be permitted following a letters precedence code, however, for in that event its meaning is something other than a rejection or acceptable instruction. Therefore the translator 20 produces a third output in response to a letters precedence code. This output, represented by the arrow 34, is routed to the precedence detector 22, which responds, as represented by arrow 36, by preventing the translator 20 from switching the acceptance-rejection flip-flop 18, so that the latter can neither energize nor deenergize the rejection relay 16. As a result, the receipt of a letters precedence code assures the maintenance of the status quo so far as the editing operation is concerned, regardless of what apparent acceptability information may follow.

It is necessary, however, that upon the occurrence of the next figures precedence code an ensuing acceptability code will initiate the proper response. Therefore, as indicated by arrow 38, the tape reader to tape punch output (arrow 23) is sampled by the precedence detector 22, and the next figures precedence code appearing on that output terminates the operation by which the translator 20 had been disabled. This once again enables translator 20 to switch the acceptance-rejection flip-flop 18, which is then capable of energizing or deenergizing the rejection relay 16 to terminate or resume operation of the tape punch 14 on the subsequent occurrence of a rejection or acceptance code.

Figure 2:
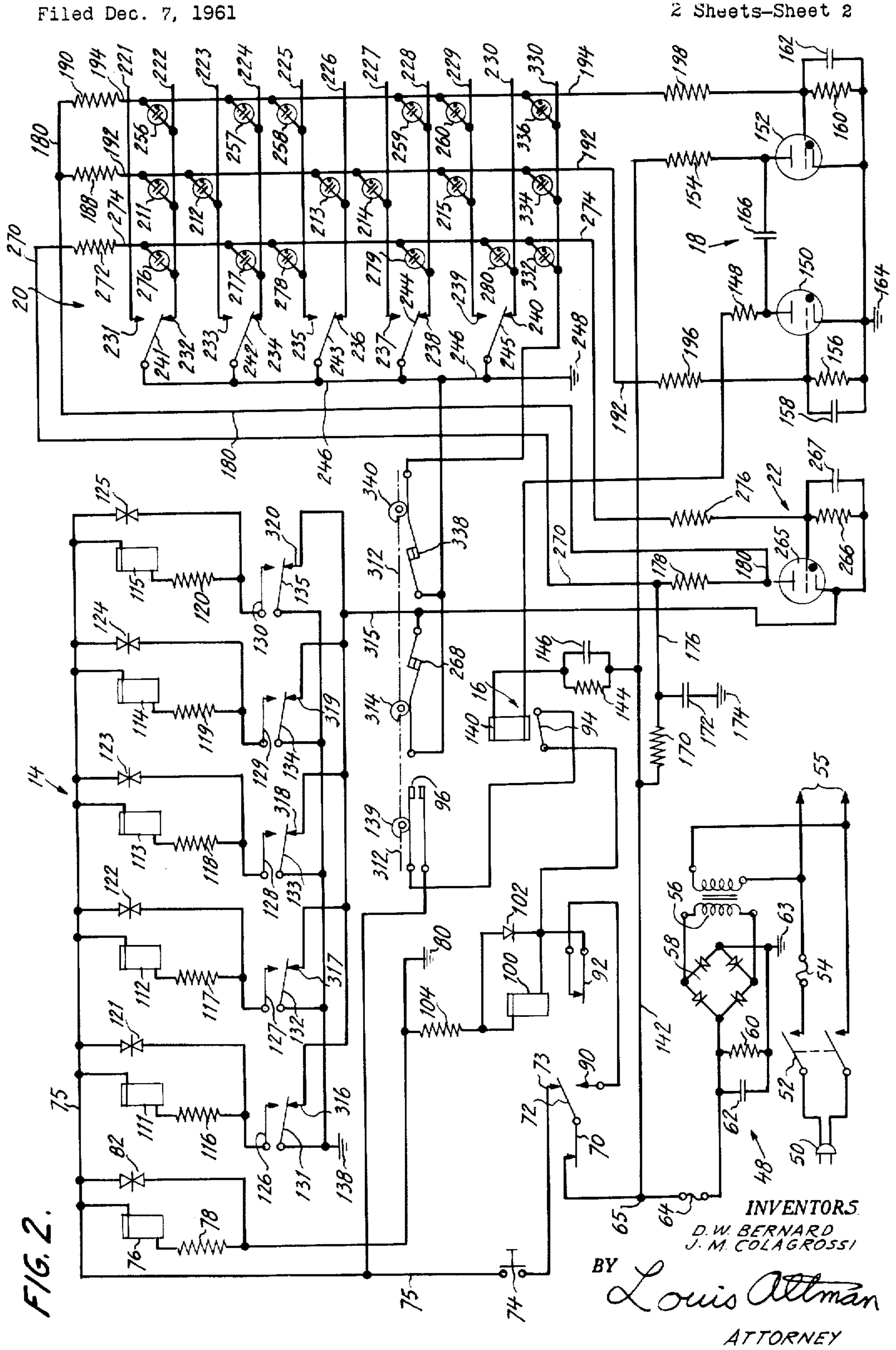
FIG. 2 is a schematic diagram of an illustrative circuit for the tape editor of FIG. 1.

Turning next to the detailed circuitry of the tape editor, FIG. 2 illustrates a conventional power supply 48 which includes a plug 50 for connection to a standard 105–130-volt, 60-cycle A.C. line; a double pole, single throw on-off switch 52; and a fuse 54. As indicated by arrows 55, the alternating voltage is supplied directly to one or more electric motors which operate continuously while the tape editor is in use, and which can be mechanically connected, as will subsequently be described, by appropriate solenoid-operated clutches to operate the tape drives of the tape reader and the tape punch 14. The tape reader, the tape drives of the tape reader and the tape punch 14, and the electric motors and solenoid-operated clutches which operate these tape drives, as well as certain other components, are not shown as they are all conventional and their illustration is not necessary to a full understanding of the invention.

The tape correction circuitry of FIG. 2 requires a direct current supply which is secured from a transformer 56, a diode rectifier bridge 58 in the secondary circuit thereof, and an R-C filter comprising a resistor 60 and a capacitor 62 connected across the output of the rectifier bridge. The negative side of the filtered D.C. output is grounded at 63, while the positive side passes through a fuse 64 to a terminal 65 and thence to the tape correction circuitry.

One of several leads carrying the D.C. power from positive terminal 65 is connected through a tight-tape switch 70 on the tape drive (not shown) of the tape punch 14 to a double throw switch 72. The latter switch is shown in its "stand by" position in which the power supply is connected from the switch contact 73 thereof through a biased-open tape feed switch 74 and then through a lead 75 to a solenoid 76 which operates the clutch of the tape drive that feeds the copy tape through tape punch 14. (This clutch, like the tape drive, is not shown.) A resistor 78 is in series with solenoid 76 on the line which returns to ground at 80, while an arc suppressor 82 is connected across the series combination of the solenoid 76 and resistor 78. Thus, when double throw switch 72 is in the illustrated "stand by" position, the biased-open tape feed switch 74 may be temporarily closed to energize clutch solenoid 76 and thereby throw in the clutch of the tape drive of tape punch 14. Since this switch 74 makes it possible to energize the punch tape drive clutch solenoid 76 without simultaneously operating the tape reader, the copy tape can be advanced independently of whether the tape reader is then operating. This enables the operator to advance the copy tape relative to the original tape in the tape reader.

In contrast, the function of the alternative, or "operate," position of double throw switch 72 is to operate the tape reader simultaneously with the punch tape drive clutch solenoid 76. Accordingly, the other switch contact 90 of double throw switch 72 is connected through a tight-tape switch 92 on the tape drive of the reader (not shown), the normally closed switch 94 of reject relay 16, and a pair of normally open solenoid timing contacts 96 to the lead 75. Thus it is seen that this branch of the circuit circumvents the tape feed switch 74, and supplies power to lead 75 independently thereof to energize the punch tape drive clutch solenoid 76.

Another branch of the "operate" circuit proceeds from the reader tight-tape switch 92 through a solenoid 100 which operates the clutch of the reader tape drive (not shown). A diode 102 is connected cross the reader tape drive clutch solenoid 100 for arc suppressing purposes, and the parallel combination of the solenoid 100 and diode 102 is returned through resistor 104 to ground at 80. Thus when the double throw switch 72 is connected to the "operate" circuit via switch contact 90, not only can the clutch solenoid 76 be energized when switch 94 and contacts 96 are closed to operate the tape drive of tape punch 14, but also the reader tape drive is operated so as to bring along the succession of holes in the original tape to be read by the tape reader. This contrasts with the previously described "stand by" position of double throw switch 72, in which it is seen that the reader tape drive clutch solenoid 100 is out of the circuit to hold the original tape idle in the tape reader while the copy tape can be advanced relative thereto.

Lead 75 is also connected to energize five-hole punch solenoid 111 through 115, each of which is connected in series with one of five resistors 116 through 120 respectively and has one of five arc suppressors 121 through 125 respectively connected across the series combination of the solenoid and resistor. These solenoids 111 through 115 respectively operate the five punches (not shown) of the tape punch 14 situated respectively at the five hole positions across the width of the punch tape in the conventional five level code system, so that energization of any one or more of these solenoids results in a hole being punched in the copy tape at the various hole positions corresponding thereto. Such energization is provided in the desired pattern and sequence under the program control of the tape reader to make a reproduction of the original tape by returning the circuit of each of the tape punch solenoids 111 through 115 to ground through respective ones of five contacts 126 through 130. These contacts, which form part of a first set of sensing contacts in the tape reader, correspond to the respective five hole positions of the five-level code, and are contacted by respective ones of five tape reader sensing switch arms 131 through 135 whenever a hole appears at the respective hole positions corresponding thereto on the original tape. The five sensing switch arms 131 through 135 are all returned to a common ground at 138 to complete the energizing circuit of each one of the respective tape punch solenoids 111 through 115 corresponding to the hole positions at which holes are sensed, thus actuating these tape punch solenoids to copy such holes. The signals from the tape reader resulting from this sensing operation constitute the input represented by arrow 23 of FIG. 1.

It can now be appreciated that the advance of the copy tape achieved by means of tape feed switch 74 is a no write-in feed, because the original tape, as it lies idle in the tape reader, does not bring along a succession of holes for sensing by the tape reader to actuate the hole punch solenoids 111 through 115.

As noted above, when the double throw switch 72 is in the "operate" position for normal tape editor use, energization of the tape drive clutch and hole punch solenoids 76 and 111 through 115 of tape punch 14 is controlled by the normally closed switch 94 of the rejection relay 16, and by the normally open solenoid timing contacts 96. The function of these components is to assure that advancing and punching of the copy tape takes place only at the proper times for reproduction of the correct portions of the original tape.

Turning first to the solenoid timing contacts 96, these normally remain open to prevent operation of the solenoids 76 and 111 through 115 of tape punch 14, but when a code is sensed by the tape reader, and after the logic circuitry of the tape editor has had time to sample that code, the solenoid timing contacts 96 are closed by a cam 139 mounted on the tape drive shaft of the tape reader (not shown), and the aforesaid solenoids may then be energized, if the rejection relay 16 permits.

Turning next to rejection relay 16, it is seen that the switch 94 thereof must be closed in order for solenoids 76 and 111 through 115 to advance and punch the copy tape. It is also seen that this rejection relay switch 94 is normally closed to permit such operation. Energization of the rejection relay coil 140, however, is effective to open the switch 94, disabling the tape punch 14 by opening the energizing circuit of its tape advance and punch solenoids 76 and 111 through 115. This is the operation symbolized by arrow 30 in FIG. 1.

The rejection relay coil 140 is energized from the positive terminal 65 of the D.C. power supply through a lead 142 and a peaking circuit comprising a resistor 144 and capacitor 146. The purpose of the latter is to permit a peak of current through the relay coil 140 to energize it rapidly, but thereafter (when capacitor 146 has charged) to reduce the current in the coil 140 and thus decrease power dissipation. The other side of the rejection relay coil 140 is connected through a load resistor 148 to the plate of a rejection thyratron 150 comprising one side of acceptance-rejection flip-flop 18. Thus the coil 140 of rejection relay 16 is in series with the plate supply of rejection thyratron 150, and is energized to disable the tape punch 14 when that thyratron is ignited. This is the operation symbolized by arrow 28 of FIG. 1.

Subsequent deenergization of the rejection relay coil 140 is accomplished by extinguishing rejection thyratron 150, which is the function of an acceptance thyratron 152 on the other side of acceptance-rejection flip-flop 18. The latter thyratron draws its plate power from lead 142 through a load resistor 154. Each thyratron has a grid-to-cathode circuit comprising a parallel combination of a resistor 156 and capacitor 158 in the case of rejection thyratron 150, and resistor 160 and capacitor 162 in the case of acceptance thyratron 152, and their cathodes are both tied to ground potential at 164 to complete their respective ignition circuits. Flip-flop action by the thyratrons 150 and 152 is secured through the capacitive coupling afforded by a capacitor 166 connected between their plates, so that ignition of acceptance thyratron 152 extinguishes the rejection thyratron 150 and latches the acceptance-rejection flip-flop 18 in the acceptance conduction state, which de-energizes the rejection relay coil 140 and keeps it deenergized, thus allowing relay switch 94 to close and thereby enabling the tape punch 14. Ignition of rejection thyratron 150 extinguishes acceptance thyratron 152 and latches the acceptance-rejection flip-flop 18 in the rejection condition state which energizes rejection relay coil 140 and keeps it energized, thus opening relay switch 94 to disable tape punch 14.

Switching of the acceptance-rejection flip-flop 18 back and forth between these conduction states is accomplished by applying a positive ignition pulse to the grid of one or the other of the thyratrons 150 and 152. Supplying this signal voltage at the appropriate times is the function of the precedence detector 22. The latter includes a resistor 170 which is connected to the positive terminal 65 of the D.C. power supply and which is part of a decoupling network including a capacitor 172 connected from the negative side of resistor 170 to ground at 174. A lead 176 then connects this network to a load resistor 178, which in turn is connected to a lead 180. Whenever there is no current being drawn through this portion of the circuit, the voltage applied through load resistor 178 to lead 180 is the high potential of the positive terminal 65 of the D.C. power supply. Under such circumstances this positive signal is communicated by the lead 180 through two resistors 188 and 190 respectively to rejection and acceptance lines 192 and 194 respectively of the translator 20. Then, depending upon the logical conditions set up in the translator 20, this positive signal may be applied by translator rejection or acceptance line 192 or 194 through resistor 196 or 198 respectively to the grid of rejection thyratron 150 or of acceptance thyratron 152. The voltage levels about the circuit are set so that this positive grid signal associated with the no current condition of load resistor 178 is high enough for ignition of rejection or acceptance thyratron 150 or 152, such ignition being the operations symbolized by arrows 26 and 32 respectively of FIG. 1.

We may now turn to the logic circuitry by which the acceptance-rejection decisions are made. When a high positive ignition signal is transmitted through the load resistor 178 and lead 180, it is gated by the translator 20 so that the acceptance-rejection flip-flop 18 can be switched to the rejection conduction state upon the receipt of one particular combination of code inputs, and to the acceptance conduction state upon the receipt of another such combination, and in their absence can not be switched at all. The five neon tubes 211 through 215 arranged along translator rejection line 192 form a rejection gate so connected to the line 192 that any one of these neon tubes, by conducting, can drop the voltage thereon so low that the signal reaching the grid of thyratron 150 is below the ignition level. Therefore the logical condition of the ignition of rejection thyratron 150 is that none of the rejection gate tubes 211 through 215 be grounded. The tubes of this gate are connected to various ones of the ten translator cross lines 221 through 230, which in turn are connected to a second set of ten tape reader sensing contacts 231 through 240 respectively. The five odd-numbered tape reader sensing contacts 231 to 239 of this second set are contacted by the appropriate one of a second set of five tape reader sensing switch arms 241 through 245 whenever a hole is sensed thereby in the respective one of the five hole positions corresponding thereto, while the five even-numbertd contacts 232 to 240 are similarly contacted thereby whenever no hole is sensed, thus providing an alternative or double throw type of switching action. This is the input from the tape reader which is represented by arrow 24 of FIG. 1. The tape reader sensing switch arms 241 through 245 are all connected through a lead 246 to a common ground at 248, so that contact with its respective one of the five switch arms 241 through 245 grounds any of the ten contacts 231 through 240, its associated one of the ten translator cross lines 221 through 230, and any neon tubes connected thereto. The rejection gate neon tubes 211 through 215 connect translator rejection line 192 to translator cross lines 222, 223, 226, 227, and 229 respectively. Therefore, if any one of the tape reader sensing switch arms 241 through 245 contacts any one of the tape reader sensing contacts 232, 233, 236, 237, or 239 connected to these lines, the rejection line 192 will be connected to ground point 248 across the relatively small voltage drop of a conducting neon tube. This drops the voltage below the level which, in view of the voltage divider formed by resistors 196 and 156, must appear on line 192 to achieve ignition. If, however, all tape reader sensing switch arms 241 through 245 contact the tape reader sensing contacts 231, 234, 235, 238, and 240 respectively, a positive ignition signal on line 192 will be transmitted through the translator 20 and resistor 196 to the grid of rejection thyratron 150. This particular combination of contacts occurs only on the sensing of one code symbol: hole, no hole, hole, no hole, and no hole; which, in the particular five level punch code for which the illustrative circuit of FIG. 2 is designed, represents the program instruction "reject." Thus the rejection thyratron 150 will be ignited to energize the rejection relay coil 140 and disable the tape punch 14 when, and only when, the load resistor 178 is not conducting and the flip-flop switching signal thus transmitted is passed by the rejection gate 211 through 215 upon the sensing of a rejection code input from the tape reader. This is the operation indicated by arrow 26 of FIG. 1.

The same type of gating process is applied to the ignition signal on lead 180 so far as its ability to traverse the translator acceptance line 194 through resistor 190 is concerned. In this case, however, the five neon tubes 256 through 260 comprising an acceptance gate connect line 194 to translator cross lines 222, 224, 225, 228, and 229 respectively and thence through contacts 232, 234, 235, 238, or 239 respectively, when any one of these contacts is connected by the appropriate one of the tape reader sensing switch arms 241 through 245, to lead 246 and ground point 248. Arrow 24 of FIG. 1 again indicates the input from the tape reader provided by this second set of sensing contacts and switch arms. Thus an ignition signal reaches the grid of acceptance thyratron 152 through translator acceptance line 194 when, and only when, the load resistor 178 is not conducting and the flip-flop switching signal derived therefrom is passed by the acceptance gate 256 through 260 upon the sensing of a particular code input from the tape reader. This particular input corresponds to the code symbol: hole, hole, no hole, hole, and no hole which results in selection of the only combination of tape reader sensing contacts, namely 231, 233, 236, 237, and 240, which does not drop the acceptance signal. This code symbol is the acceptance instruction in the particular code employed, and the signal which it passes switches the acceptance-rejection flip-flop 18, as represented by arrow 32 of FIG. 1, to deenergize the rejection relay coil 140 and re-enable the tape punch 14.

The load resistor 178 is kept in a nonconducting condition to supply a flip-flop switching signal whenever it is desired that acceptance and rejection code inputs pass such a signal to produce the described acceptance or rejection response. But since these instructions are figures precedence coded in the particular punch code for which this illustrative circuit is designed, such responses are appropriate only when the last previous precedence code input was for figures precedence. Therefore, a means is provided for preventing the switching of the acceptance-rejection flip-flop 18 from either conduction state to the other whenever a letters precedence code input is received from the tape reader.

This is accomplished by reducing the signal levels which can be transmitted to the rejection and acceptance thyratron 150 below the level required for ignition thereof. The method employed is the drawing of a large current through load resistor 178 so that the resulting voltage drop thereacross brings the potential on lead 180 below the level required for transmitting an ignition signal to the grids of rejection and acceptance thyratrons 150 and 152. For drawing such current the precedence detector 22 includes a thyratron 265 and its grid-to-cathode circuit comprising the parallel combination of a resistor 266 and capacitor 267. This precedence detector thyratron 265 takes its plate voltage from the junction of load resistor 178 and lead 180, while the ignition circuit thereof is completed by grounding its cathode, which is usually accomplished through a pair of normally closed precedence timing contacts 268 returned to ground at 248. Whenever the precedence detector thyratron 265 is cut off, it draws no current through load resistor 178, and consequently there is no voltage drop thereacross. But when the thyratron 265 is ignited, the plate current drawn by it through load resistor 178 produces the desired voltage drop thereacross so that even if logical conditions in translator 20 permit, the voltage applied through lead 180, resistors 188 or 190, and translator rejection or acceptance line 192 or 194 to the grid of the rejection or acceptance thyratron 150 or 152 is too low for ignition. Thus, under these circumstances, even if an apparent acceptance or rejection code is sensed, the precedence detector 22 prevents the acceptance-rejection flip-flop 18 from being switched.

A means is provided for ignition of the precedence detector thyratron 265 to produce this result when, and only when, a letters precedence code input is received from the tape reader. A lead 270 is connected from the positive side of the load resistor 178 through a resistor 272, a precedence line 274 of the translator 20, and a resistor 276 to transmit a positive ignition level to the grid of figures precedence detector thyratron 170 whenever the logical conditions in the translator 20 are appropriate. This ignition signal is gated by the translator 20 in the same manner as the ignition signals for the acceptance-rejection flip-flop 18 just described. The positive voltage on translator precedence line 274 is dropped across any one of five precedence gate neon tubes 276 through 280 connecting the line 274 to translator cross lines 222, 224, 225, 228, and 230 respectively whenever any one of these is contacted by its respective one of the tape reader sensing switch arms 241 through 245 which are connected through lead 246 to ground point 248. In that case acceptance and rejection responses will be able to take place, because in the absence of a high signal thyratron 265 will remain cut off, and its load resistor 178 when not conducting supplies a high positive ignition voltage for switching the rejection or acceptance thyratron 150 or 152. An ignition signal for figures precedence detector thyratron 265 will get through the translator 20, however, the operation symbolized by arrow 34 of FIG. 1, when all five tape reader sensing switch arms 241 through 245 select their respective tape reader sensing contacts 231, 233, 236, 237, and 239, a condition corresponding to the sensing of only one symbol: hole, hole, no hole, hole and hole; which represents the program instruction "letters precedence" in the particular code employed. This input from the second set of tape reader sensing contacts once again is symbolized by arrow 24 of FIG. 1. Upon receipt of this letters precedence code input, ignition of precedence detector thyratron 265 reduces the signal voltage available from the then conducting load resistor 178 below the level required to switch the acceptance-rejection flip-flop 18, regardless of any apparent acceptance or rejection codes subsequently sensed. This operation, which is symbolized by arrow 36 of FIG. 1, assures that any apparent acceptance or rejection code inputs from the tape reader will not set off an acceptance or rejection response when the last previous precedence code input was for letters precedence.

As is usual with a thyratron, once it is ignited by a letters precedence code input from the tape reader the grid of the precedence detector thyratron 265 loses control and the tube continues to conduct until its plate-to-cathode voltage is reduced sufficiently to extinguish it. Such extinction is required on the occurrence of the next succeeding figures precedence code input so as to make a high signal voltage available again from load resistor 178 for switching acceptance-rejection flip-flop 18 and thereby preparing the tape editor to respond to succeeding acceptance and rejection code inputs. Reduction of the plate-to-cathode voltage to extinguish the precedence detector thyratron 265 is accomplished by opening its cathode-to-ground circuit. In order to achieve this, one requisite is that the normally closed precedence timing contacts 268 be opened, which is done after each tape reader code-sensing cycle by a cam 314 ganged, as indicated by dashed line 312, with cam 139 on the reader tape drive shaft (not shown). But even if the precedence timing contacts 268 are open, the cathode of thyratron 265 can be grounded through a lead 315 connecting it directly to each of five contacts 316 through 320 belonging to the first set of tape reader sensing contacts. These are no-hole contacts selected in double throw fashion by the respective tape reader sensing switch arms 131 through 135 as alternatives to the hole contacts 126 through 130 whenever no hole appears at the positions corresponding to the respective switch arms. Since the tape reader sensing switch arms 131 through 135 are connected to a common ground at 138, the appearance of no hole at one of the five hole positions is sufficient to connect to ground potential the corresponding one of the tape reader sensing contacts 316 through 320, thus grounding the cathode and completing the circuit of the precedence detector thyratron 265. Therefore, only the appearance of a five-hole symbol, which in the particular code employed means "figures precedence," can gate with the opening of the precedence timing contacts 268 to open the cathode-to-ground circuit of precedence detector thyratron 265 and thus extinguish it after it has been ignited. This operation, which is symbolized by arrow 38 of FIG. 1, cuts off the plate current previously drawn through load resistor 178, restoring the enabling voltage level supplied thereby so that the acceptance-rejection flip-flop 18 can again be switched in response to acceptance and rejection codes following the figures precedence code.

In addition to the ten cross lines 221 through 230, there is provided an additional translator cross line 330 which is connected to the translator precedence, rejection, and acceptance lines 274, 192, and 194 by three neon tubes 332, 334, and 336 respectively which form a timing gate. Through these tubes the crossline 330 drops the voltage on all the translator main lines 274, 192, and 194 through a pair of normally closed translator timing contacts 338 and the lead 246 connected to ground point 248. The translator timing contacts 338 remain closed during the transfer time of the tape reader sensing switch arms 241 through 245, thus closing the entire translator 20 and preventing any signal at all from being passed therethrough. This eliminates any possible spurious signals which could occur during such transfer. After transfer is complete, translator timing contacts 338 are briefly opened by a cam 340 to allow the translator 20 to sample the tape reader input, and the contacts 338 are then reclosed before the re-transfer of the tape reader sensing switch arms 241 through 245. The cam 340, as is indicated by the dashed line 312, is ganged with cams 139 and 314 on the tape drive shaft of the reader (not shown).

It will be appreciated that the illustrative circuitry described can be used with other types of data input and output, for example by using magnetic transducers or other recording and reading devices in place of the tape punches 111–115 and the sensing switches 131–135 and 241–245. In addition a rearrangement of the logic circuitry of translator 20 is all that is necessary to permit response to any other five level code, and, with a change in the number of translator cross lines 221–230, any multi-level code.

The following is a table of practical electrical values of components for the illustrative circuit just described:

| Reference Numeral | Resistors | Capacitors | Fuses |
|---|---|---|---|
| 54 | | | 2A Slow blow. |
| 60 | 2 K | | |
| 62 | | 500 µf 200 V | |
| 64 | | | 3/4 A. |
| 78 | 1 K | | |
| 104 | 2 K | | |
| 116 through 120 | 1 K | | |
| 144 | 5.6 K. 2 W | | |
| 146 | | 20 µf. 150 V | |
| 148 | 680 Ohms | | |
| 154 | 12 K | | |
| 156 | 2.2 Ohms | | |
| 158 | | 510 µµf | |
| 160 | 2.2 Ohms | | |
| 162 | | 510 µµf | |
| 166 | | 0.5 µf 450 V | |
| 170 | 470 Ohms | | |
| 172 | | 12 µf. 450 V | |
| 178 | 12 K | | |
| 188 | 390 K | | |
| 190 | 390 K | | |
| 196 | 360 K | | |
| 198 | 360 K | | |
| 266 | 2.2 Ohms | | |
| 267 | | 510 µµf | |
| 272 | 390 K | | |
| 276 | 360 K | | |

The rejection relay 16 may be a C. P. Clare No. 3750, which has a 600-ohm, 9600-turn coil. The tubes 150, 152, and 265 may be No. 5823 thyratrons, while the neon diodes of the translator 20 are all NE–2's.

Figure 3:
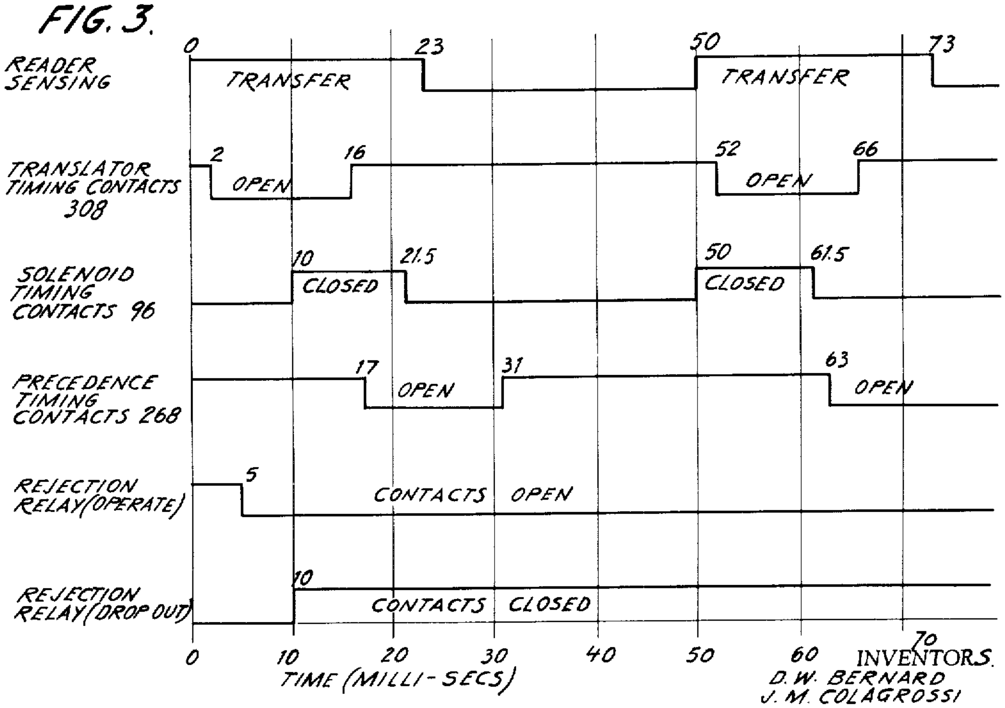
FIG. 3 is a timing chart for the tape editor of the preceding figures.

The timing of the tape editor may now be described in the context of a number of illustrative cycles of operation. The tape reader motor (not shown) draws alternating line current from the power supply leads 55, and when double throw switch 72 is in the "operate" position reader clutch solenoid 100 connects it to rotate the reader tape drive pulley (not shown) at 1200 r.p.m. In this way, the original tape is advanced backwards past a tape reader sensing location at which are located both sets of tape reader sensing switch arms and contacts 131 through 135, 126 through 130, and 316 through 320, plus 241 through 245 and 231 through 240. It will be recalled that the tape reader sensing switche arms 131 through 135 and 241 through 245 transfer to their respective hole contacts 126 through 130 and the odd-numbered contacts 231 to 239 only when the original tape presents a hole thereto. When no hole appears in a hole position, and in between punched symbols, no hole is sensed and these switch arms remain at or transfer back to their respective no hole contacts 316 through 320 and the even-numbered contacts 232 to 240. If the tape reader is in the process of reading a line of data which has just been signalled as acceptable, whenever a punched symbol arrives at the sensing location, both sets of reader sensing switch arms 131 through 135 and 241 through 245 transfer at each hole position where the symbol has holes. The moment of their transfer is called, with reference to the timing chart of FIG. 3, zero time of the particular cycle of operation devoted to the sensing of that symbol. The punched symbol takes a definite time to pass the tape reader sensing location, so that both sets of switch arms remain transferred until 23 milliseconds of that sensing cycle. Throughout that time, a code input is received by the tape editor. There is no initial response, however, because the solenoid, precedence, and translator timing contacts 96, 268, and 308 are open, closed, and closed respectively.

During each sensing cycle the translator timing contacts 308 remain closed until two milliseconds after transfer of the sensing switch arms 241 through 245, to provide clearance for avoiding spurious signals in the translator 20 during the transfer. After that, the reader tape drive shaft rotates cam 340 into position to open translator timing contacts 338 so that the translator 20 can sample this input, and at 16 milliseconds to close them again. Since the reader sensing switch arms 241 through 245 are not retransferred until 23 milliseconds, here again a clearance is provided to avoid spurious signals during their transfer. The opening of the translator timing contacts 338, however, has effect only when one of the codes for "letters precedence," "reject," or "accept" is sensed, for in their absence none of the translator lines 274, 192, or 194 transmit signals.

But later on in the sensing period, the reader tape drive shaft rotates cam 139 into position to close the solenoid timing contacts 96 at 10 milliseconds and reopen them at 21.5 milliseconds. Between those times, since we are assuming that the line of data is acceptable and rejection relay switch 94 is therefore closed, the closing of these contacts 96 completes the "operate" circuit to lead 75 and thus permits tape punch solenoids 111 through 115 to be energized once to punch a copy of the symbol on the copy tape. Clutch solenoid 76 is also energized once, and since the tape drive motor (not shown) of the tape punch 14 is drawing alternating line current from leads 55 and is therefore running, when the energization of clutch solenoid 76 briefly throws in the clutch of the tape drive (not shown) of tape punch 14, the latter is operated to advance the copy tape one step to the proper position for the punching of the next symbol. At 50 milliseconds the next cycle starts, and this process of reproduction and advance is repeated as the reader progresses backwards through each succeeding symbol of the present data line.

When, in the course of any of these successive cycles during the reading and reproduction of an acceptable data line, a letters precedence code is first sensed, the opening of translator timing contacts 338 causes the translator precedence line 274 to transmit a signal from lead 176 to ignite the precedence detector thyratron 265 and prevent the tape editor from experiencing an acceptability response to any subsequent apparent acceptability code. When the next figures precedence code, all holes, occurs in any subsequent cycle, that means all the first set of reader sensing switch arms 131 through 135 are selecting their respective hole contacts 126 through 130. Therefore, none of the no-hole contacts 316 through 320 are grounded, and as a result, the grounding circuit extending through lead 315 to the cathode of precedence detector thyratron 265 is not completed. From 17 to 31 milliseconds of each successive sensing cycle the reader tape drive shaft rotates cam 314 into position to open precedence timing contacts 268, thus opening the other one of the two grounding circuits for the cathode of the precedence detector thyratron 265. Thus, from 17 to 23 milliseconds of a figures precedence sensing cycle, both cathode grounding circuits are open simultaneously, extinguishing the precedence detector thyratron 265 and alerting the tape editor to attribute an acceptability meaning to any subsequent acceptability codes. But no figures precedence code will be followed by any acceptability codes until the present data line is finished and the reader arrives at the acceptability information of the next data line. Thus during the reading of any data line the precedence detector thyratron 265 may repeatedly go on in response to each letters precedence code to forestall an acceptability response, and off in response to each figures precedence code just in case it turns out to be part of the acceptability information of the next data line.

As the tape reader progresses backwards through the original tape and comes to the next line of data, the first part of that line to be read is the acceptability information pertaining thereto, which is punched at the back end of the line. Furthermore, the first part of that acceptability information to be read is the precedence instruction thereof, which is a figures precedence instruction. Then when the precedence timing contacts 268 open during this cycle, the precedence detector thyratron 265 is extinguished in preparation for the ensuing acceptability code. At 23 milliseconds the figures precedence symbol on the original tape moves past the tape reader sensing location, and the tape reader sensing switch arms 131 through 135 and 241 through 245, since they no longer sense any holes, are retransferred. The consequent selection of no hole contacts 316 through 320 grounds the cathode of the precedence detector thyratron 265, and the reclosing of contacts 268 by cam 314 at 31 milliseconds completes the other cathode grounding circuit thereof as well. But neither is effective to reignite the thyratron 265. Such regrounding of the cathode is a necessary, but not a sufficient, condition of reignition, because an appropriate grid signal is also required, which depends upon the occurrence of a letters precedence code. Therefore the precedence detector thyratron 265 remains extinguished during the sensing of the next code, which is either an acceptance or a rejection code, and this assures the proper conditions for an acceptability response thereto by providing a high flip-flop switching signal.

Regardless of the previous condition of the acceptance-rejection flip-flop 18, this signal will control. If the code is an acceptance instruction, the acceptance-rejection flip-flop 18, already in the acceptance conduction state because the last data line was acceptable, will not be switched, the switching signal merely traversing the translator acceptance line 194 to the grid of acceptance thyratron 152, which is already on. No change will occur, and this data line will be reproduced just like the last one, the tape editor again going through the process just described. But if the code is a rejection instruction, the switching signal traverses translator rejection line 192 to ignite the rejection thyratron 150 which until then was extinguished because the last previous data line was acceptable. The acceptance-rejection flip-flop 18 then switches and becomes latched in the rejection conduction state to energize rejection relay coil 140. This causes the rejection relay switch 94 to open at 5 milliseconds and remain open thereafter throughout the present cycle and succeeding cycles of this data line. Therefore, despite the fact that cam 139 later closes solenoid timing contacts 96 during each such cycle, the solenoids 76 and 111 through 115 are not energized, and no advance of the copy tape or reproduction of the erroneous data occurs during all those cycles. Here again, the precedence detector thyratron 265 switches on and off in response to each succeeding letters and figures precedence code respectively during the reading of the data line, but this cannot affect the rejection relay 16 until the rejected data line is finished and the next line comes along, preceded by acceptability information comprising a figures precedence code to extinguish the precedence detector thyratron 265 and an ensuing acceptability code.

If that acceptability code is a rejection instruction, once again no change will occur and this time it is the rejection procedure which is repeated. However, if it is an acceptance instruction, a signal will be transmitted on translator acceptance line 194 and will reignite acceptance thyratron 152, relatching the acceptance-rejection flip-flop 18 in the acceptance conduction state and de-energizing rejection relay coil 140. In that event, the rejection relay switch 94 closes at 10 milliseconds of the cycle and remains closed during that and succeeding cycles. At this point the data is again reproduced, and the described operating cycle can start over.

The particulars of the foregoing description are illustrative rather than restrictive, since considerable modification thereof is possible without departing from the scope of this invention as it is defined in the appended claims.

The invention claimed is:

1. A device for making an amended reproduction of a data record which contains acceptability information including codes representing one precedence and acceptance-rejection instructions coded according to said precedence; said device comprising recording means operable to selectively reproduce said data record in response to an input representing the data thereon, means operable to disable said recording means in response to the combination of said precedence and rejection code inputs, and means operable to enable said recording means in response to the combination of said precedence and acceptance code inputs.

2. A device for making an amended reproduction of data record which contains acceptability information including codes representing one precedence and acceptance-rejection instructions coded according to said precedence; said device comprising electrically actuated recording means including an actuating circuit therefor operable to produce said data record in response to an input representing the data thereon, means operable to open said recording means actuating circuit in response to the combination of said precedence and rejection code inputs, and means operable to close said recording means actuating circuit in response to the combination of said precedence and acceptance code inputs.

3. A device for making an amended reproduction of a data record which contains acceptability information including codes representing one precedence and acceptance-rejection instructions coded according to said precedence; said device comprising electrically actuated recording means including an actuating circuit therefor operable to selectively reproduce said data record in response to an input representing the data thereon, means for disabling said recording means including a rejection relay for opening and closing said recording means actuating circuit and means for causing said rejection relay to open said recording means actuating circuit in response to a combination of said precedence and rejection code inputs, and means operable to cause said rejection relay to close said recording means actuating circuit in response to the combination of said precedence and acceptance code inputs.

4. A device for making an amended reproduction of a data record which contains acceptability information including codes representing one precedence and acceptance-rejection instructions related to corresponding data entries and coded according to said one precedence; said device comprising electrically actuated recording means including an actuating circuit therefor operable to selectively reproduce said data record in response to an input representing the data thereon, means for disabling said recording means including a rejection relay operable upon energization to open said recording means actuating circuit and means for energizing said rejection relay in response to a rejection code input, and precedence detecting means operable to enable said rejection relay energizing means in response to said one precedence code input and to disable said rejection relay energizing means in response to another precedence code input.

5. A device for making an amended reproduction of a data record which contains acceptability information including codes representing one character-group uniqueness precedence and acceptance-rejection instructions related in a predetermined manner to corresponding data entries and coded according to said one precedence; said device comprising electrically actuated recording means including an actuating circuit therefor operable to selectively reproduce said data record in response to an input representing the data thereon, means for disabling said recording means including a rejection relay operable upon energization to open said recording means actuating circuit and means for energizing said rejection relay in response to a rejection code input, a precedence detector operable to disable said rejection relay energizing means in response to a precedence code input other than said one precedence, and means operable to terminate such operation of said precedence detector in response to said one procedence code input whereby to enable said rejection relay energizing means.

6. A device for making an amended reproduction of a data record which contains acceptability information including codes representing one precedence and acceptance-rejection instructions coded according to said one precedence; said device comprising electrically actuated recording means including an actuating circuit therefor operable to reproduce said data record in response to an input representing the data thereon, and means operable to disable said recording means in response to the combination of said one precedence and rejection code inputs including a rejection relay operable upon energization to open said recording means actuating circuit and means for initiating and terminating rejection relay energization in response to rejection and acceptance code inputs respectively, a precedence detector operable to disable said rejection relay energizing means in response to a precedence code input other than said one precedence, and means operable to terminate such operation of said precedence detector in response to said one precedence code input whereby to enable said rejection relay energizing means.

7. A device for making an amended reproduction of a data record which contains acceptability information including codes representing one precedence and acceptance-rejection instructions related in a predetermined manner to corresponding data entries and coded according to said one precedence; said device comprising electrically actuated recording means including an actuating circuit therefor operable to selectively reproduce said data record in response to an input representing the data thereon, and means operable to disable said recording means in response to the combination of said one precedence and rejection code inputs including a rejection relay operable upon energization to open said recording means actuating circuit and switching means connected to control rejection reliay energization, a translator connected to control said switching means for initiating and terminating such rejection relay energization in response to rejection and acceptance code inputs respectively, a precedence detector operable to prevent said switching means from energizing said rejection relay, said translator being connected to so operate said precedence detector in response to a precedence code input other than said one precedence, and means operable to terminate such operation of said precedence detector in response to said one precedence code input whereby to enable said switching means.

8. A device for making an amended reproduction of a data record which contains acceptability information including codes representing one precedence and acceptance-rejection instructions coded according to said one precedence; said device comprising electrically actuated recording means including an actuating circuit therefor operable to selectively reproduce said data record in response to an input representing the data thereon, and means operable to disable said recording means in response to the combination of said one precedence and rejection code inputs including a rejection relay operable upon energization to open said recording means actuating circuit and automatic means for energizing said rejection relay including an acceptance-rejection flip-flop connected for one conduction state thereof to effect rejection relay energization, a translator connected to control said acceptance-rejection flip-flop for initiating and terminating such rejection relay energization in response to rejection and acceptance code inputs respectively, a precedence detector operable to selectively prevent switching of said acceptance-rejection flip-flop, said translator being connected to so operate said precedence detector in response to a precedence code input other than said one precedence, and means operable to terminate such operation of said precedence detector in response to said one precedence code input whereby to permit switching of said acceptance-rejection flip-flop.

9. A data record editor for making an amended reproduction of a prepared data record, where the data is coded in predetermined groups of discrete manifestation, each group accompanied on the record by indicia of either an acceptance instruction or a rejection instruction, said editor comprising: means for reading respective groups of discrete manifestations of a prepared data record, said reading means including means for sensing the accompaning indicia of either acceptance or rejection of the respective ones of said groups; translating means responsively coupled to said reading means for providing a first valued signal in response to the sensing of said acceptance indicia and a second valued signal in response to the sensing of said rejection indicia; electrically actuatable recording means coupled to said reading means for selectively reproducing ones of said groups of discrete manifestations on a new data record medium; actuating means, including circuit means responsively coupled intermediate said translating means and said recording means for selectively enabling reproduction of associated groups by said recording means in response to said first valued signals and disabling reproduction of associated groups by said recording means in response to said second valued signals.

10. A device for making an amended reproduction of a data record, where the data is coded in predetermined groups of discrete manifestations, and is accompanied on the record by indicia of either an acceptance-instruction or a rejection-instruction and character uniqueness codes indicative of either letters-precedence or figures-precedence, said device comprising: means for reading data manifestations from a data record, said reading means including circuit means for providing signal groupings representative of the data read; translating means, including an output disabling circuit, responsively coupled to said reading means for providing an acceptance-signal in response to a sensed acceptance-instruction, a rejection-signal in response to a sensed rejection-instruction, and a letters-precedence signal in response to a sensed letters-precedence code; a flip-flop circuit responsively coupled to said translating means for providing a first valued output signal in response to said acceptance-signal and a second valued output signal in response to said rejection-signal; electrically actuatable recording means, including an activating circuit, coupled to said reading means for selectively reproducing ones of said groups of data manifestations on a new record medium; circuit means coupling said actuating circuit to said flip-flop circuit for enabling said recording means in response to said first valued output signal and disabling said recording means in response to said second valued output signal; and character-uniqueness precedence detecting means coupled to said translating means for providing a first signal to actuate said output disabling circuit in response to said letters-precedence signal received from said translating means for preventing any change of state of said flip-flop, said detecting means including circuit means for sensing figures-precedence codes responsively coupled to said reading means for providing a second signal to deactivate said output disabling circuit in response to said sensed figures-precedence codes, whereby editing is allowed to proceed according to the acceptance-rejection instructions.

References Cited by the Examiner

UNITED STATES PATENTS

| | | | |
|---|---|---|---|
| 2,764,750 | 9/1956 | Wright | 340—172.5 |
| 3,025,498 | 3/1962 | Blodgett | 340—172.5 |
| 3,061,192 | 10/1962 | Terzian | 235—157 |
| 3,075,178 | 1/1963 | James | 340—172.5 |

ROBERT C. BAILEY, *Primary Examiner.*

MALCOLM A. MORRISON, *Examiner.*

R. B. ZACHE, *Assistant Examiner.*